United States Patent [19]

Hightower

[11] 4,161,212

[45] Jul. 17, 1979

[54] PNEUMATICALLY CONTROLLED WIDE HEAT LOAD SPACE RADIATOR

[75] Inventor: Stanley J. Hightower, Lakewood, Colo.

[73] Assignee: Martin Marietta Corporation, Rockville, Md.

[21] Appl. No.: 764,564

[22] Filed: Jan. 28, 1977

[51] Int. Cl.² .................... F28F 13/00; F28F 1/22
[52] U.S. Cl. .................... 165/96; 126/271; 165/154; 165/171; 244/163; 244/173
[58] Field of Search .................... 165/96, 154, 104 M, 165/171, 168; 126/271; 244/158, 163, 173

[56] References Cited

U.S. PATENT DOCUMENTS

| | | | |
|---|---|---|---|
| 1,870,684 | 8/1932 | Killeffer | 165/96 |
| 2,109,169 | 2/1938 | Field | 165/96 |
| 2,903,495 | 9/1959 | Dickson et al. | 165/154 |
| 3,167,159 | 1/1965 | Bovenkerk | 165/96 |
| 3,270,802 | 9/1966 | Lindberg | 165/96 |
| 3,496,195 | 2/1970 | Rosen et al. | 244/163 |
| 3,536,278 | 10/1970 | Walley | 244/163 |
| 3,823,305 | 7/1974 | Schroder | 165/96 |
| 4,054,981 | 10/1977 | Bridgegum | 165/154 |

Primary Examiner—Charles J. Myhre
Assistant Examiner—Sheldon Richter
Attorney, Agent, or Firm—Sughrue, Rothwell, Mion, Zinn and Macpeak

[57] ABSTRACT

A three way valve selectively charges or discharges gas under pressure within the annular gaps between a series of transversely extending longitudinally spaced radiator tubes fixed to a radiator panel to control waste heat rejection and coaxial inner tubes which may comprise heat pipes or turns of a sinuous coolant flow tube for spacecraft, earth satellites and the like to thermal couple and decouple the heat pipe or coolant flow tube to the space radiator.

7 Claims, 4 Drawing Figures

PNEUMATICALLY CONTROLLED WIDE HEAT LOAD SPACE RADIATOR

BACKGROUND OF THE INVENTION

1. Field of the Invention

This invention relates to spacecraft and the employment of thermal radiators in the form of heat conductive panels for the rejection of waste heat, and more particularly to a control system for thermally coupling and decoupling thermal radiator tubes to and from the radiator panel.

2. Description of the Prior Art

Heat transfer is difficult in spacecraft due to the absence of gravity and the presence of low vacuum conditions. Heat transfer has been effected both by the forced flow of coolant media either in liquid or gaseous form through suitable heat conductive tubes and by the employment of heat pipes. Heat pipes comprise an envelope or tube carrying internally on the envelope or tube surface or by a separate member, a capillary flow path and being provided with a mass of vaporizable working fluid such that by heating one end of the tube or envelope, working fluid in liquid form is vaporized and travels as vapor through the internal space of the tube to its other end, where heat is rejected during condensation of the working fluid, and the condensed working fluid travels back again to the end of the tube which is subjected to heat input by capillary action defining a loop process causing heat transfer from one end to the other.

In order to dissipate waste heat within manned and unmanned spacecraft, earth satellites and the like, conventionally the heat has been transmitted to planar heat conductive members constituting planar heat radiators which radiate the waste heat away from the spacecraft body. Conventionally, coolant tubes or heat pipes are mounted in heat transfer fashion to the surface of the planar heat radiator panel. Attempts have been made to control the extent of heat rejection by controlling the flow of heat from the heat pipes or radiator tubes to the radiator panels. Prior practices include by-pass control, regenerative heat exchange control, and stagnation control. By-pass control requires auxiliary heat to be added during low load conditions which in turn requires an auxiliary source of heat to that resulting during heavy load and of course mandating the necessity for effective rejection of the waste heat. Regenerative control functions adequately, but the weight of the regenerator required for wide heat load ranges establishes practical limits on this method of the rate of waste heat rejection. Stagnation control is also quite effective and was used on the Apollo project with a 2.5 to 1 load range. However, the stagnation control is subject to possible tube splitting which occurs during freezing of the coolant, and further, in changing from low to high heat transfer load, excessive time is required (up to two hours in an examplary system).

It is, therefore, a primary object of this invention to provide a waste heat rejection control system for wide heat load space vehicle radiators which does not require freezing of the radiator tubes and has a rapid response from minimum to maximum heat transfer loads.

There has been developed a movable joint structure for an assembly subjected to cryogenic temperatures within a vacuum environment and incorporating paired heat pipes which are mounted to respective interengaging relatively movable heat conductive heat pipe support members which define a gap between the support members. U.S. patent application Ser. No. 700,366 filed June 28, 1976, entitled "Gas Filled Swivel Joint for Cryogenic Heat Pipes", now U.S. Pat. No. 4069864 and assigned to the common assignee, employs ball and socket conductive support members permitting rotation of one heat pipe relative to the other about orthogonal axes with a pressurized gas interposed between the spherical opposed surfaces of the ball and socket support members to achieve a low impedance heat path across the gap between the ball and socket support members.

It is, therefore, a further object of the present invention to employ a pneumatic control technique to achieve the thermal coupling and decoupling of the radiator tubes fixed to the radiator panel, to coaxial, internal, longitudinally extending coolant tubes or heat pipes, and by modulation of the gas pressure achieve a variable thermal impedance path between the concentric tube array formed thereby.

SUMMARY OF THE INVENTION

The present invention is directed to a pneumatically controlled wide heat load space radiator assembly for a spacecraft, earth satellite or the like, and comprising in combination a heat radiator mounted to the spacecraft, at least one tube array mounted to the heat radiator in thermal conduction fashion and comprising concentric, radially spaced inner and outer heat conductive tubes and including means defining a sealed annular gap between said tubes over a given longitudinal extent thereof, and means for selectively supplying a gas under pressure to said sealed annular gap between said concentric tubes or for venting that annular gap to space to vary the thermal impedance between said tubes and the heat rejection rate of said spacecraft radiator.

The spacecraft heat radiator may comprise a planar conductive metal panel, said at least one array of concentric inner and outer tubes may comprise a plurality of separate, linear outer tube sections fixed to at least one face of said panel in longitudinally spaced, transverse, parallel fashion, and wherein a continuous inner tube extends in sinuous fashion and includes a plurality of turns which pass through and are concentric with the separate outer tube sections to form separate concentric tube arrays with means provided at the ends of the outer tube sections for sealing the ends of the annular gaps formed between the outer tube sections and portions of the continuous inner tube. The means for selectively supplying a gas under pressure to the gaps between said concentric tubes may comprise a source of gas under pressure and a gas manifold leading from said source and being connected to each of said outer tube sections with three way valve means located within said manifold between the source and said outer tube sections for selectively controlling the mass of gas supplied to said annular gaps and for venting said gaps to space. O-ring seals may be fixedly mounted between said outer and inner concentric tubes at the ends of the tube sections to form the sealed annular gaps between the outer tube sections and portions of said continuous inner tube which selectively receive gas under pressure for varying the thermal impedance therebetween.

DESCRIPTION OF THE PREFERRED EMBODIMENT

Figure 1:
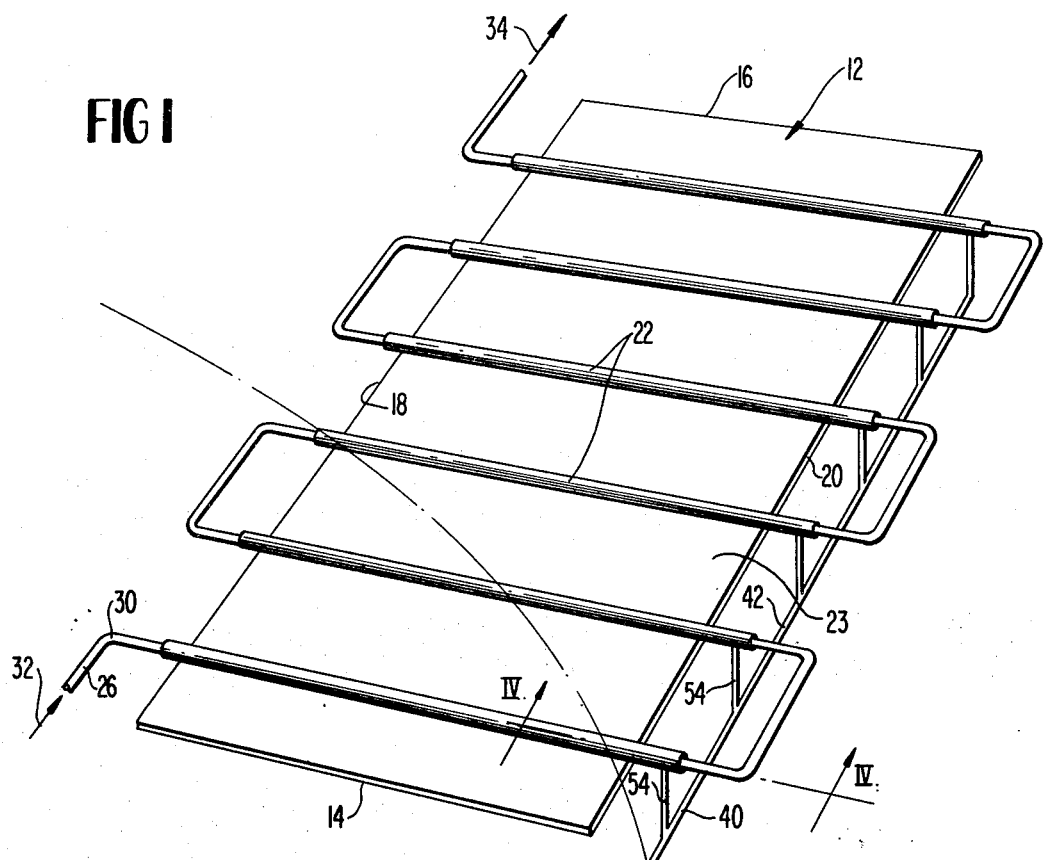
FIG. 1 is a perspective view of a spacecraft employing the pneumatically controlled, wide heat load space radiator of the present invention.
Figure 2:
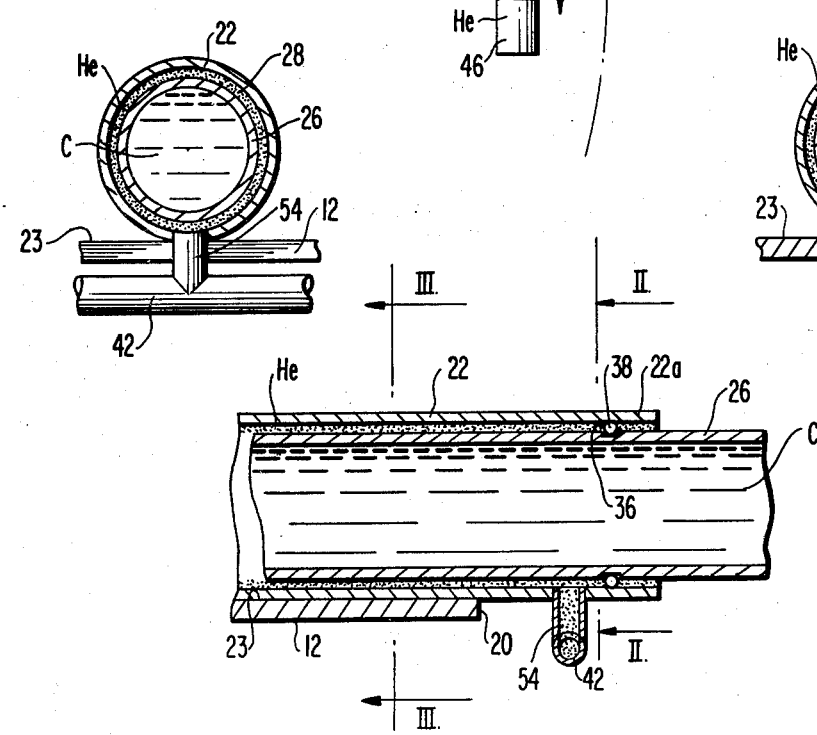
FIG. 2 is a sectional view through one of the concentric tube arrays of the space radiator shown in FIG. 1 taken about lines II—II of FIG. 4.
Figure 3:
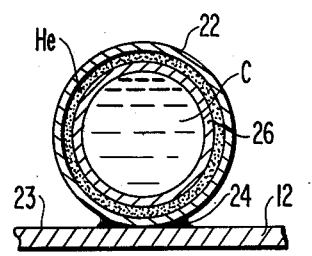
FIG. 3 is a sectional view of the portion of the space radiator shown in FIG. 4 taken about lines III—III.
Figure 4:
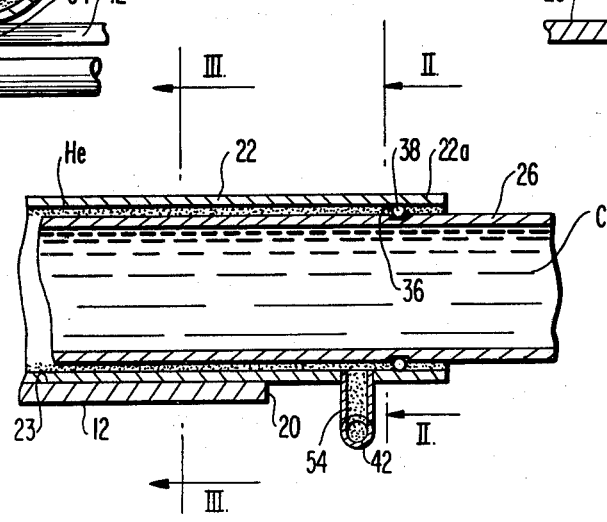
FIG. 4 is a longitudinal sectional view of a portion of the space radiator shown in FIG. 1 taken about lines IV—IV.

The pneumatically controlled wide heat load space radiator of the present invention is particularly useful for rejecting waste heat generated by equipment carried interiorly of a spacecraft vehicle. In that regard, FIG. 1 illustrates in dotted line, a spacecraft body 10 having a heat radiator comprising a planar radiator panel 12 of rectangular configuration fixed to and extending radially of the spacecraft body 10. The panel 12 has a radially inner end 14 which is mounted to the side of the spacecraft body 10 by means (not shown) and has a radially outboard end 16 and laterally opposed sides 18 and 20. The radiator 12 may comprise a unitary metal sheet of high thermal conductivity such as aluminum or the like. The panel 12 may be fixed to the spacecraft body 10 prior to launch in the position and under the configuration shown, or may be of the deployable type wherein the panel 12 is carried internally or wrapped about the spacecraft body and deployed to the radial projecting position shown subsequent to the spacecraft reaching a predetermined altitude relative to the planet from which it is launched. As seen more particularly in FIGS. 2, 3 and 4, the upper face or surface 20 of the panel 12 has fixedly mounted thereto a plurality of straight, radiator tubes or outer tube sections 22 which are of cylindrical form and are bonded by bonding material 24 to panel 12 in thermal conducting fashion, the bonding material 24 constituting a metal braze material, metal filled epoxy resin or the like. The radiator tubes 22 may be formed of a light weight metal such as aluminum identical to that forming panels 12. Tubes 22 are of a length which is in excess of the transverse width of panels 12 such that the ends 22a extend axially beyond the sides 18 and 20 of the radiator panel 12. Further, the radiator tubes are mounted to surface or face 23 of panel 12 at longitudinally spaced positions, the radiator tubes extending parallel to each other and being at right angles to the longitudinal axis of panel 12 and thus extending transversely across the panel.

In the illustrated embodiment, each of the radiator tubes 22 constitute individual tube sections of concentric tubular arrays which are completed by a unitary, coolant flow tube 26 which is also of circular cross-section and has an external diameter which is somewhat smaller than the internal diameter of the radiator tubes 22. The coolant flow tube is bent at right angles to form unitary inner tube portions which extend coaxially through radiator tubes 22 with the tubes 22 being concentric therewith and being spaced therefrom to define annular gaps 28 therebetween. The coolant tube 26 is bent therefore into serpentine or sinuous form by way of the right angle bends 30 being made at points axially beyond the ends 22a of radiator tubes 22 to each side of the space radiator panel 12. In the illustrated embodiment, a coolant media C is forced to flow through the coolant tube 26 by means of pressure from a source (not shown) which coolant enters the coolant tube 26 at one end, as evidenced by arrow 32, and exits from tube 26, after passing through all of the radiator tubes 22, adjacent the outboard end 16 of panel 12 as seen by arrow 34. In this illustrated embodiment, coolant tubes are employed for directing the waste heat to the radiator panel 12 although heat pipes may alternatively be employed and form the inner of the two concentric tubes for each array where the outer of the two concentric tubes are fixed to and are in heat conductive contact with surface 23 of panel 12. The coolant tube 26 may also be formed of metal of high thermal conductivity such as aluminum. The annular gaps 28 which exist between the portions or sections of coolant tube 26 which extends axially through the center of the various radiator tubes 22, are sealed from exterior space. In this case, the coolant tube 26 is provided with annular grooves 36 within the outer periphery of the same at points axially inward of ends 22a of the outer, radiator tubes 22, and O-ring sealing members 38 are mounted within the annular grooves 36 and sealably bear on opposite sides, against the bottom of grooves 36 and the inner periphery of the outer radiator tubes 22, respectively.

The present invention employs a manifold assembly indicated generally at 40, to supply in a selective manner gas to the annular gaps 28 which define heat transfer chambers or to open the annular gaps to outer space. In this regard, manifold 40 consists of an elongated, main manifold tube 42 which bears at its inboard end adjacent to or within spacecraft body 10 a solenoid controlled three way valve 44 which is interposed within main manifold tube 42 between panel 12 and a relatively small, gaseous helium storage bottle 46. The bottle 46 is directly connected to the solenoid valve 44 by way of manifold supply tube 48. The three way solenoid valve 44 carries a vent tube 50 which may be selectively fluid coupled to the manifold main line tube 42 by valve 44 which then shuts off the connection from the storage bottle 46 to main manifold tube 42. Solenoid 44 is energized by supplying electrical energy thereto from a source (not shown) via leads 52. When solenoid valve 44 is unenergized, fluid connection is automatically made between the vent pipe or tube 50 and manifold main line tube 42. Branch tubes 54 fluid connect the manifold main line 42 to the radiator tubes 22, opening to the annular gaps 28 axially inboard of O-ring seals 38, FIG. 4. The main manifold tube 42, manifold branch lines 54, as well as storage bottle supply line 48 and vent tube 50 may also be formed of aluminum or similar light weight metal and suitably brazed or soldered to form connections therebetween, to the three way solenoid valve 44 and to the radiator tubes 22. With the helium gas stored under pressure within the helium storage bottle 46, energization of the solenoid valve 44 opens fluid communication between bottle 46 and the annular gaps 28. The solenoid valve may be of the type in which, depending upon the value of the current supplied to leads 52 may modulate the pressure, that is, vary the pressure of the gas and mass of gas supplied to the chambers 28 to vary the rate of heat transfer between coolant C and the helium gas He existing within coolant tube 26 and gaps 28 (the annular space between coolant tube 26 and the heat radiator tube 22 for the multiple coolant radiator tube arrays). Upon de-energization of the solenoid three way valve 44, the annular gaps 28 may be vented to space by fluid connecting main manifold tubes 42 and vent tube 50 as seen by arrow 46.

It is by way of the illustrated embodiment of the present invention that a thermal load range of greater than 500 to 1 may be obtained without freezing the coolant tube 26 (or heat pipes if they are employed in lieu of coolant tubes 26 at each radiator tube location). Further, upon energization of the solenoid valve 44, it is possible to recover from low to high heat loads within minutes, the energization of the valve closing off the manifold to the vent tube 50 and supplying in lieu of vacuum within the annular gaps 28, helium under bottled pressure. The helium gas under pressure acts as a good thermal conductor, essentially short circuiting the high thermal impedance path provided by the vacuum which normally exists within gaps 28 between portions of the coolant tube 26 and the various radiator tubes 22 when the manifold is open to the vent tube 50.

While the invention has been particularly shown and described with reference to a preferred embodiment thereof, it will be understood by those skilled in the art that various changes in form and details may be made therein without departing from the spirit and scope of the invention.

What is claimed is:

1. A pneumatically controlled, wide heat load, space radiator assembly for a spacecraft, earth satellite, or the like, said radiator assembly comprising in combination:
   a heat radiator mounted to the spacecraft for thermal radiation to space, said heat radiator having a face,
   at least one tube array mounted to the face of the heat radiator in thermal conducting fashion, said array comprising concentric, radially spaced, longitudinally extending inner and outer heat conductive tubes,
   means defining a sealed annular gap between said tubes of a given longitudinal extent thereof,
   a coolant media within said inner heat conductive tube in thermal contact with said inner heat conductive tube and constituting the waste heat load for said space radiator assembly, and
   means for selectively supplying a gas under pressure to said sealed annular gap between said concentric tubes or for venting said annular gap to space to vary the thermal impedance between said inner and outer heat conductive tubes and modulate the waste heat rejection rate of said spacecraft radiator assembly.

2. The space radiator assembly as claimed in claim 1, wherein said means for selectively supplying gas under pressure to the gap between said at least one tube array, comprises a source of gas under pressure, a gas manifold fluid connecting said source to said at least one tube array, a vent tube and a three way valve located within said gas manifold between said source and said annular gap for selectively coupling said source or said vent tube to said sealed annular gap.

3. The space radiator assembly as claimed in claim 1, wherein said spacecraft heat radiator comprises a planar conductive metal panel and said at least one array of concentric inner and outer tubes comprises a plurality of separate, linear outer tube sections affixed to at least one face of said panel in spaced, parallel fashion, and wherein a continuously extending inner tube in sinuous fashion includes a plurality of turns which coaxially project through the separate outer tube sections to form separate, concentric tube arrays, and said sealed annular gaps between conductive tubes comprise means provided at the ends of the outer tube sections and spanning the outer tube sections and separate portions of the continuous inner tube.

4. The space radiator assembly as claimed in claim 3, wherein said means for selectively supplying gas under pressure to the gap between said at least one tube array, comprises a source of gas under pressure, a gas manifold fluid connecting said source to said at least one tube array, a vent tube and a three way valve located within said gas manifold between said source and said annular gap for selectively coupling said source or said vent tube to said sealed annular gap.

5. The space radiator assembly as claimed in claim 3, wherein said means defining a sealed annular gap between said inner and outer heat conductive tubes comprises O-ring seals at the ends of said linear outer tube sections in sealing contact with the inner periphery of the linear outer tube sections and the outer periphery of said continuous inner tube.

6. The space radiator assembly as claimed in claim 3, wherein said planar conductive panel is rectangular in form, and said linear, outer tube sections extend transversely to the longitudinal axis of the conductive metal panel.

7. The space radiator assembly as claimed in claim 6, wherein said means for selectively supplying gas under pressure to the gap between said at least one tube array, comprises a source of gas under pressure, a gas manifold fluid connecting said source to said at least one tube array, a vent tube and a three way valve located within said gas manifold between said source and said annular gap for selectively coupling said source or said vent tube to said sealed annular gap.

* * * * *